United States Patent
Yoshida

(10) Patent No.: US 7,969,417 B2
(45) Date of Patent: Jun. 28, 2011

(54) MULTIPLE CURSOR SYSTEM AND METHOD FOR VEHICLE

(75) Inventor: Ichiro Yoshida, Takahama (JP)

(73) Assignee: DENSO CORPORATION, Kairya (JP)

( * ) Notice: Subject to any disclaimer, the term of this patent is extended or adjusted under 35 U.S.C. 154(b) by 1001 days.

(21) Appl. No.: 11/882,133

(22) Filed: Jul. 31, 2007

(65) Prior Publication Data

US 2008/0259027 A1    Oct. 23, 2008

(30) Foreign Application Priority Data

Oct. 5, 2006   (JP) ................................ 2006-274050

(51) Int. Cl.
*G09G 5/08*     (2006.01)
(52) U.S. Cl. ....................................... 345/157; 715/754
(58) Field of Classification Search .................. 345/157, 345/1.1, 2.1–2.3, 3.1; 715/748, 754, 761; 709/203
See application file for complete search history.

(56) References Cited

U.S. PATENT DOCUMENTS

| | | | |
|---|---|---|---|
| 6,947,995 B2 * | 9/2005 | Chang et al. | 709/231 |
| 7,376,696 B2 * | 5/2008 | Bell et al. | 709/203 |
| 7,620,900 B2 * | 11/2009 | Kawashima et al. | 715/856 |
| 2004/0236825 A1 * | 11/2004 | Doi et al. | 709/203 |
| 2007/0192020 A1 * | 8/2007 | Brulle-Drews et al. | 701/200 |

FOREIGN PATENT DOCUMENTS

| | | |
|---|---|---|
| JP | A-7-129364 | 5/1995 |
| JP | A-2001-034411 | 2/2001 |
| JP | A-2005-038100 | 2/2005 |
| JP | A-2005-269520 | 9/2005 |

* cited by examiner

*Primary Examiner* — Chanh Nguyen
*Assistant Examiner* — Allison Walthall
(74) *Attorney, Agent, or Firm* — Posz Law Group, PLC

(57) ABSTRACT

An in-vehicle multiple cursor system properly provides information necessary for a user in case that the number of wirelessly connected portable devices increases to thereby cause lack of a memory space for drawing. A cursor operation for requesting a drawing occurs in a portable device. An in-vehicle navigation system thereby makes a determination as to whether or not a segmental memory space assigned to the portable device in a memory space of a drawing memory device has at least a predetermined data volume. When the determination is affirmed, necessary drawing data are read out from a resource database and forwarded to a drawing memory device of the portable device to be developed therein. A screen window is then displayed in a display unit of the portable device based on the developed drawing data.

9 Claims, 8 Drawing Sheets

MULTIPLE CURSOR SYSTEM AND METHOD FOR VEHICLE

CROSS REFERENCE TO RELATED APPLICATION

This application is based on and incorporates herein by reference Japanese Patent Application No. 2006-274050 filed on Oct. 5, 2006.

FIELD OF THE INVENTION

The present invention relates to an in-vehicle multiple cursor system and method adapted to an in-vehicle navigation system.

BACKGROUND OF THE INVENTION

Patent document 1 describes an information display system, which establishes individual communication lines with multiple portable devices at the same time to aggregate multiple corresponding cursor operations in a single display unit.

Patent document 1: JP-A-2005-038110

In such a display system aggregating multiple cursor operations in a signal display unit, a memory space for drawing may be assigned in a drawing memory device to each portable device when a communication line is established. When a cursor operation for requesting drawing occurs in the portable device, drawing data necessary for the drawing may be developed in the assigned memory space. Thus a screen window may be displayed in the display unit based on the developed drawing data.

Since a memory space of the drawing memory device is limited in the system, increase of the number of portable devices wireless connected with the system may cause lack of the memory space to thereby disable a requested screen window from appearing in the display unit.

SUMMARY OF THE INVENTION

It is an object of the present invention to provide an in-vehicle multiple cursor system which properly provides information necessary for a user in case that the number of wirelessly connected portable devices increases to thereby cause lack of a memory space for drawing.

To achieve the above object, according to an example of the present invention, a multiple cursor system in a vehicle is provided as follows. A communicator is included for establishing a communication line with a portable device capable of operating a cursor. A drawing data storing unit is included for storing drawing data. A drawing memory device is included for developing drawing data. A control unit is included for displaying the cursor relative to the portable device in a display unit, and defining in the drawing memory device a memory space for the portable device. A determination unit is included for performing a determination as to whether or not the defined memory space is equal to or greater than a predetermined data volume when the cursor is operated to request a drawing from the portable device via the communicator. The control unit reads drawing data necessary for the drawing from the drawing data storing unit to develop the read drawing data in the memory space in the drawing memory device, thereby displaying a screen window in the display unit when the determination is affirmed. The control unit reads drawing data necessary for the drawing from the drawing data storing unit, and transfers the read drawing data to an additional drawing memory device to develop the read drawing data in an additional memory space of the additional drawing memory device, thereby displaying a screen window in an additional display unit when the determination is negated.

According to another example of the present invention, a method is provided for displaying in a display unit multiple cursors remotely operated by a plurality of portable devices. The method comprises: receiving a request for drawing via one cursor operated from one portable device; reading drawing data necessary for the drawing; performing a determination as to whether or not the drawing is allowed in the display unit by checking for a memory space assigned to the one portable device for display in the display unit; displaying, when the determination is affirmed, a screen window in the display unit based on the read drawing data; and displaying, when the determination is negated, a screen window in an additional display unit different from the display unit based on the read drawing data transferred to the additional display unit.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An in-vehicle multiple cursor system is adapted to an in-vehicle navigation system as an embodiment. In this embodiment, three portable devices are brought in a subject vehicle to thereby establish individual communication lines with the navigation system in the subject vehicle.

Figure 1:
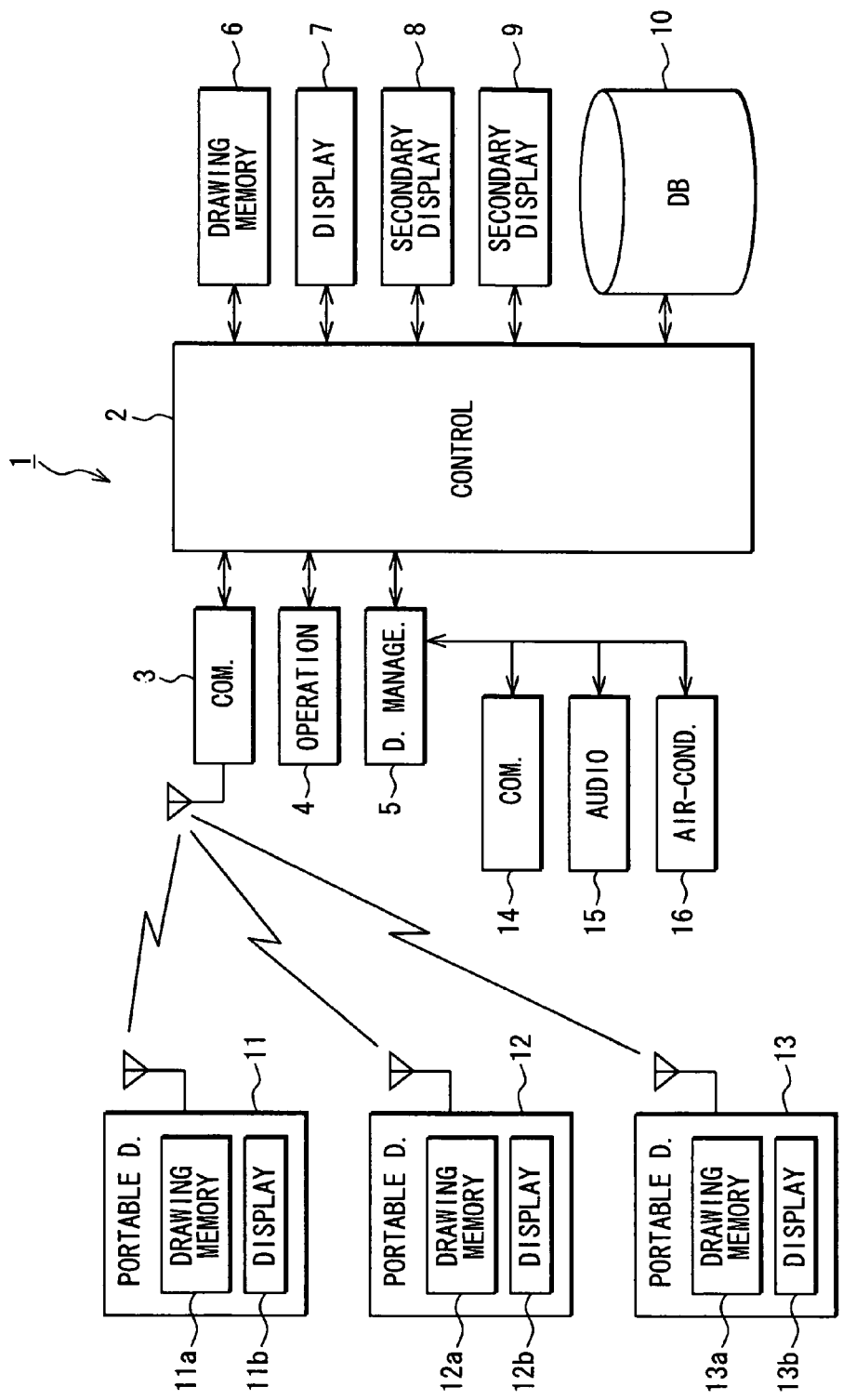
FIG. 1 is a block diagram illustrating an overall configuration of a navigation system according to an embodiment.

FIG. 1 is a block diagram illustrating a schematic configuration of an in-vehicle navigation system and portable devices. The navigation system 1 includes a control unit 2, a short range wireless communicator 3, an operation unit 4, a device management unit 5, a drawing memory device (i.e., graphic memory device) 6, a primary display unit 7, secondary display units 8, 9, and a resource database 10, which may function as a drawing data storing means or unit.

Other than the foregoing, the navigation system 1 further includes the following known components: a position detector, a map data reader, a speech recognition unit, a route retrieval unit, a route guide unit, and a communicator with an outside.

The control unit 2 includes a CPU, RAM, ROM, and Input/Output (I/O) bus to control overall operations of the system 1 such as drawing memory management, resource management, display control, communication control, and device management control. The short range wireless communicator 3 may function as a communication line establishing means or unit to form a short range wireless communication area with an extremely low electric field within an approximately whole area of a compartment of the vehicle and establishes a communication line with each of portable devices 11 to 13, which are each brought in the vehicle. The short range wireless communication is compliant with a standard such as Bluetooth (trade mark) or wireless LAN. The short range wireless communicator 3 establishes communication lines with three individual portable devices 11 to 13 at the same time. Each of the portable devices 11 to 13 is a portable phone or portable information terminal to have a control unit, a short range wireless communicator, a phone, an operation unit, a drawing memory device 11a to 13a, and a display unit 11b to 13b.

The operation unit 4 is a mechanical switch in the primary display unit 7 and/or touch-sensitive switch formed on a screen of the primary display unit 7, and outputs operation detection signals to the control unit 2 by detecting user's operation. The device management unit 5 controls operations of in-vehicle devices such as an audio device 15, an air-conditioner 16, and an in-vehicle communicator 14 for ETC (Electronic Toll Collection) or DSRC (Dedicated Short Range communication). Here, the control unit 2 analyzes device control signals transmitted from the portable devices 11 to 13 via the short range wireless communicator 3, to thereby cause the device management unit 5 to control the in-vehicle devices 14 to 16.

The primary display unit 7 includes a liquid crystal display disposed in a center console that a user primarily sees. The secondary display units 8, 9 include a head-up display or a meter-panel display, which a user secondarily sees. The resource database 10 stores, as resources, device data on the portable devices 11 to 13 and drawing data necessary for drawing screen windows. These data are stored with the following procedure. Upon establishing a communication line with each portable device 11 to 13, the control unit 2 receives a specification (usable space) for a drawing memory device 11a to 13a of the portable device 11 to 13 and a specification (display area size) for a display unit 11b to 13b. Received specifications are stored as device data relating to the portable device 11 to 13. The drawing data include not only static data such as a location of a shop but also dynamic data such as information on available parking spaces. The dynamic data are updated by the control unit 2 as needed by communicating with an outside.

Figure 2:
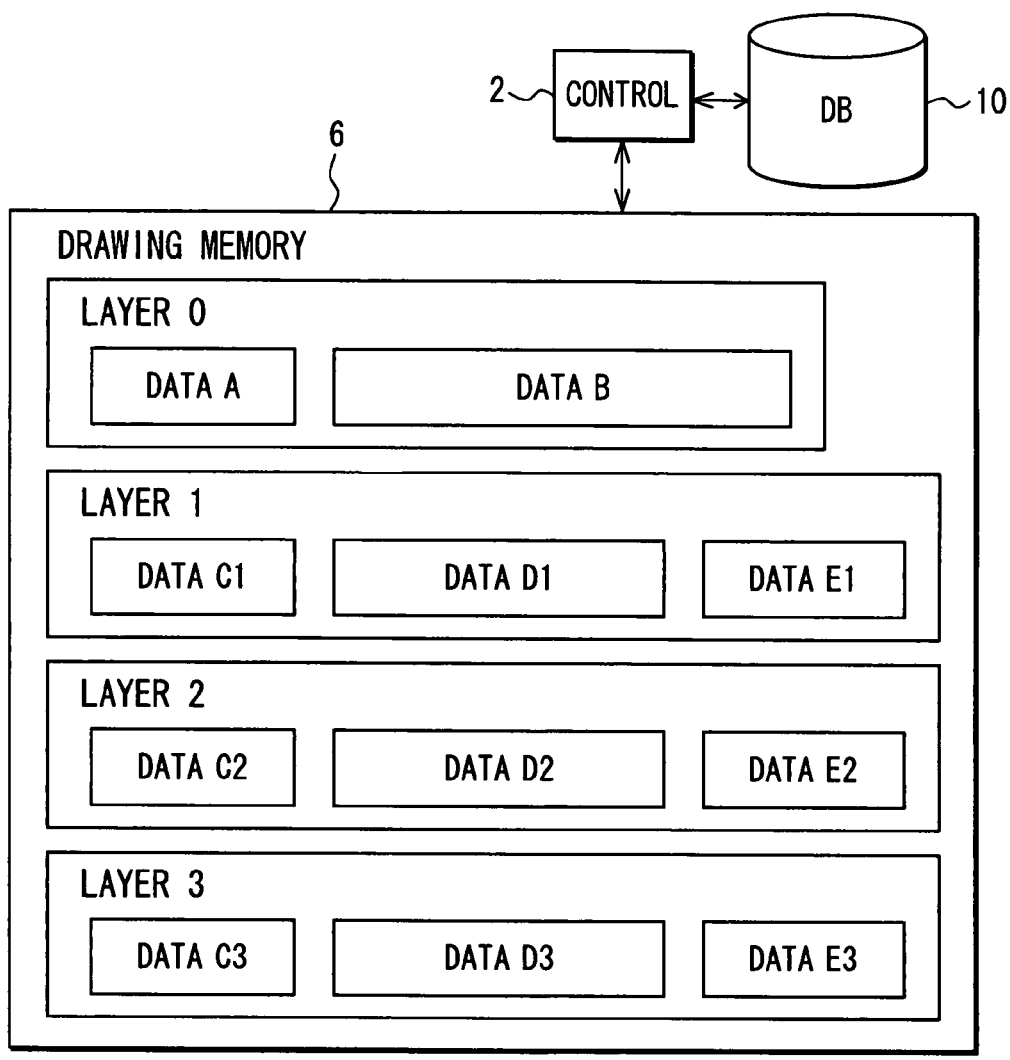
FIG. 2 is a diagram illustrating a configuration of a memory space in a drawing memory device.

FIG. 2 illustrates configuration of a memory space in the drawing memory device 6. The control unit 2 defines a memory space for developing drawing data for forming a background screen window as Layer 0. Layer 0 includes DATA A and DATA B. DATA A include background screen window data and object image data. DATA B include text layout data, button layout data or property (priority settings, display effects), and field layout data and property (font information, display effects). Further, upon establishing a communication line with each portable device 11 to 13, the control unit 2 defines sectional memory spaces for developing drawing data relative to each portable device 11 to 13 as Layer 1 to 3 and further defines a cursor operational area where a cursor operation is effective. Layers 1 to 3 each include DATA C1, C2, C3, DATA D1, D2, D3, and DATA E1, E2, E3, as shown in FIG. 2. DATA C1, C2, C3 include portable device data (device ID, user ID) relative to the individual portable devices 11 to 13. DATA D1, D2, D3 include data relating to drawing layer settings, cursor settings, active area settings, area change monitoring, and cursor movement monitoring (position determination, whether active or not). DATA E1, E2, E3 include data relating to test drawing process, graphic drawing process, and drawing error process.

Figure 3:
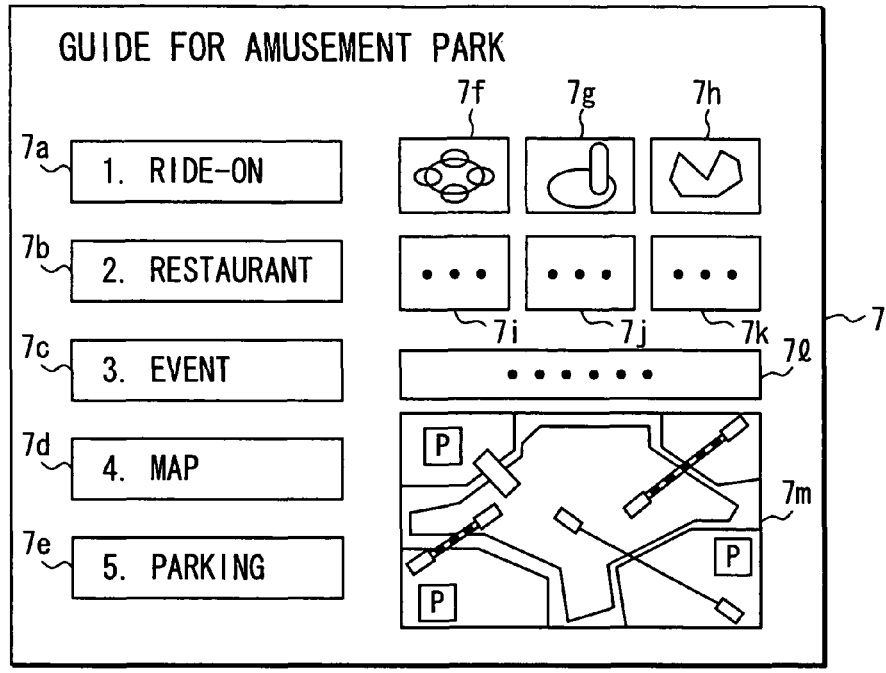
FIG. 3 is an example of a screen window in the navigation system.
Figure 5:
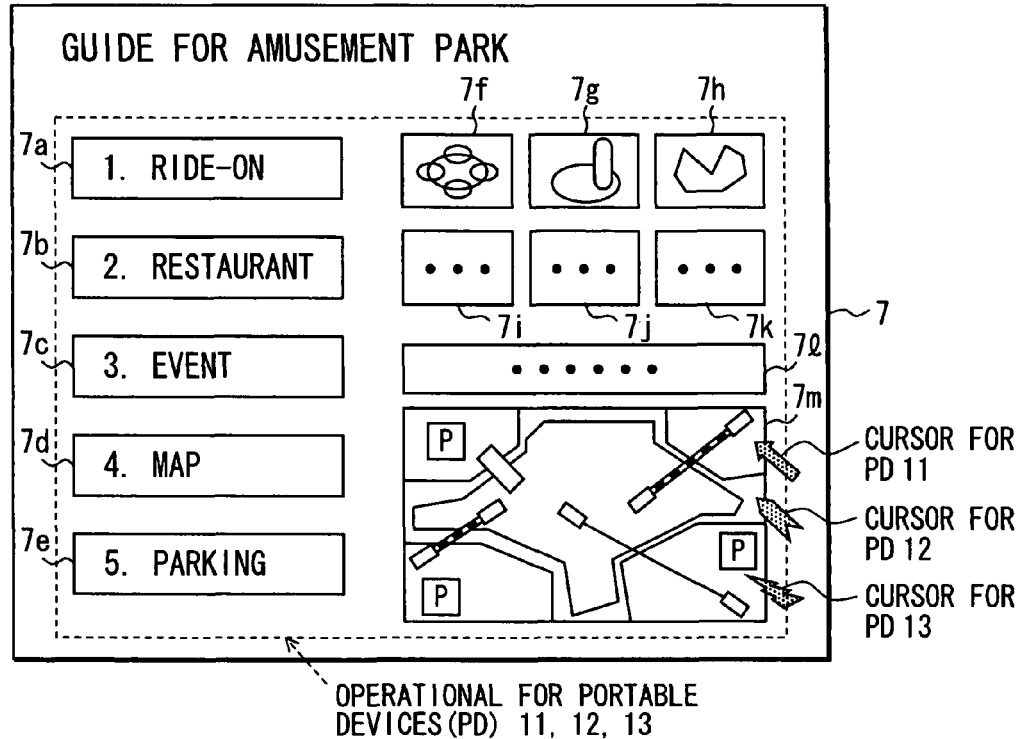
FIG. 5 is an example of a screen window in the navigation system.
Figure 4:
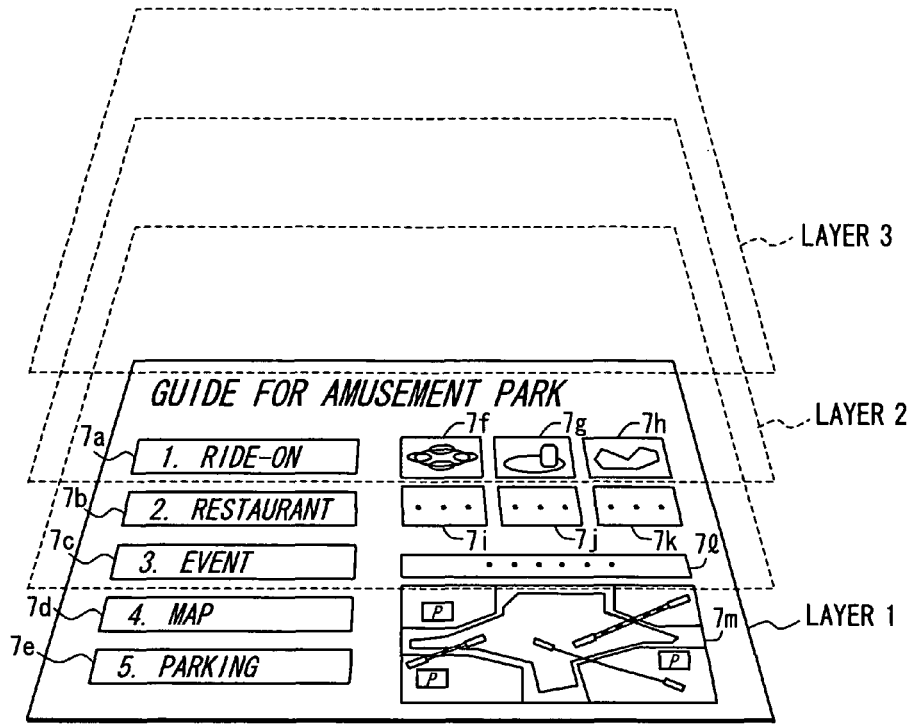
FIG. 4 is a diagram for illustrating a structure of data layers.

Incidentally, a background screen window shown in FIG. 3 is displayed in the primary display unit 7. Here, if each of Layers 1 to 3 is assigned to an approximately whole area of the background screen window as shown in FIG. 4, each cursor operational area are designated to cover all objects 7a to 7m (see FIG. 5). This allows any user of each portable device 11 to 13 to operate any object 7a to 7m. In this case, cursors may compete with each other; therefore, priority degrees may be assigned to the individual portable devices 11 to 13. This helps prevent competition of cursor operations thereof.

Figure 6:
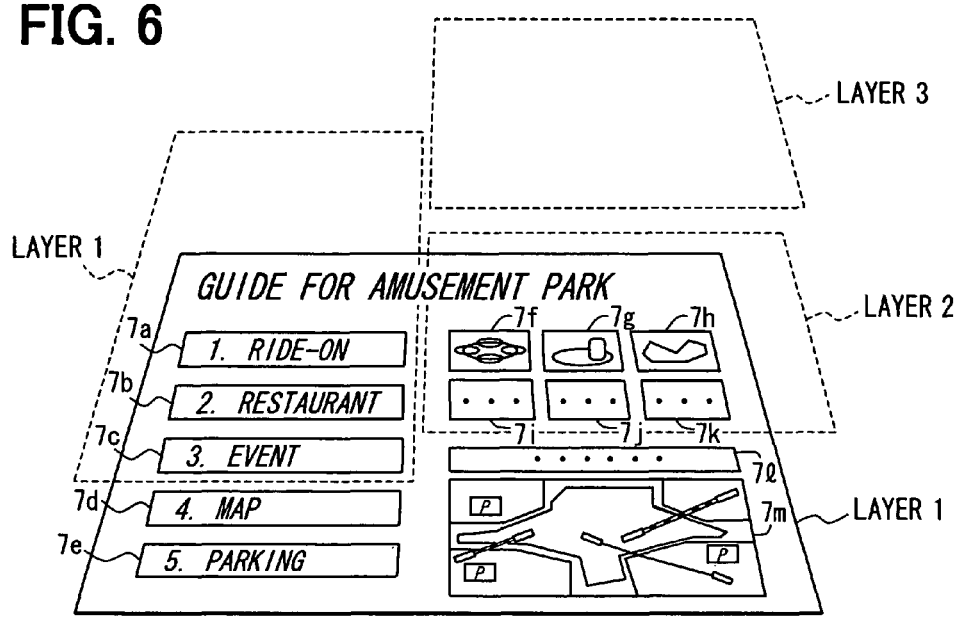
FIG. 6 is a diagram for illustrating a structure of data layers.
Figure 7:
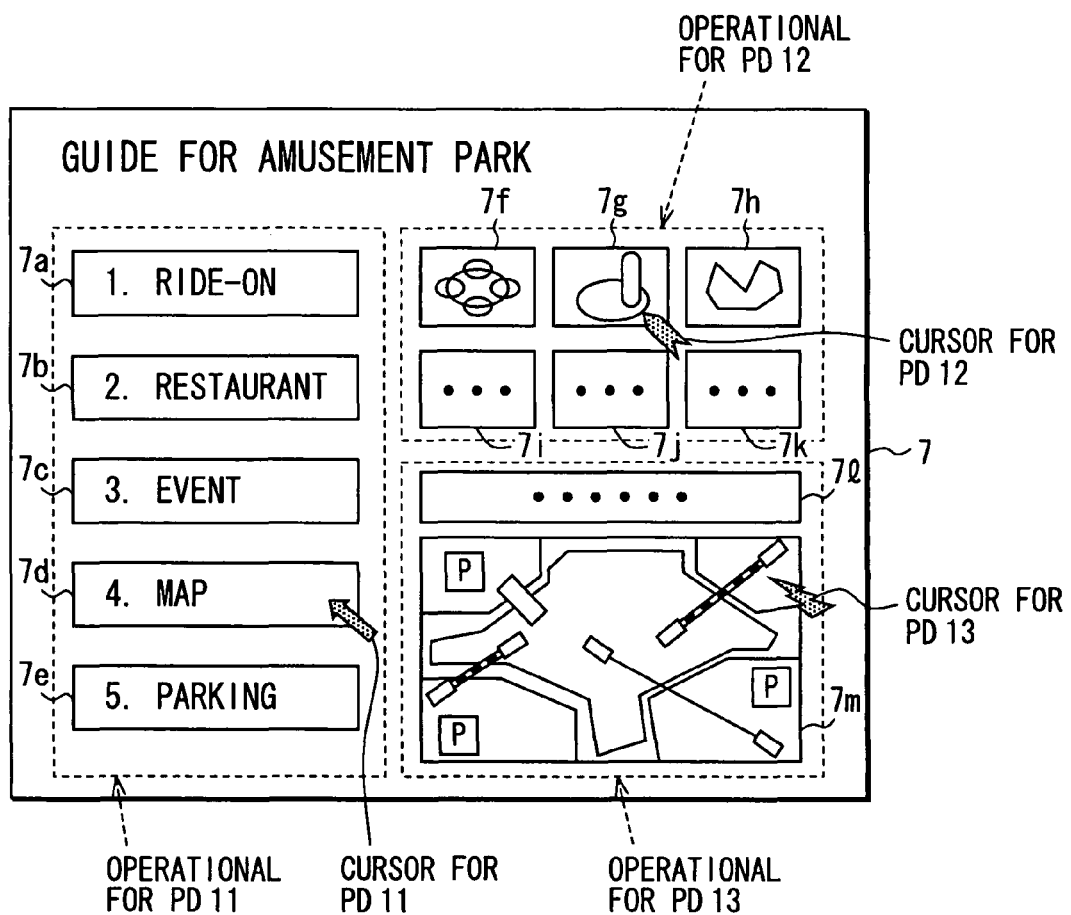
FIG. 7 is an example of a screen window in the navigation system.
Figure 8:
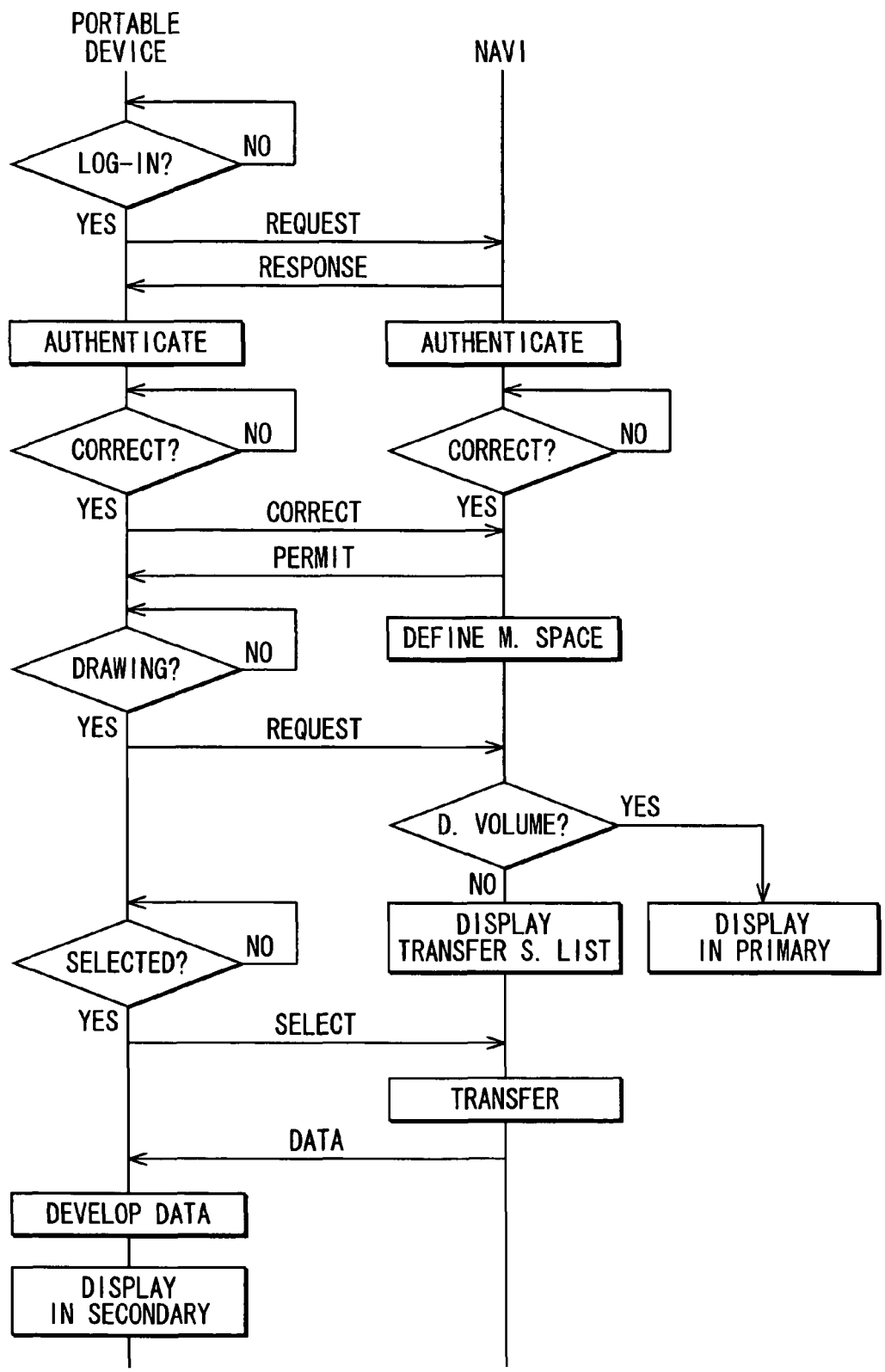
FIG. 8 is a flowchart diagram for illustrating operations in the navigation system and a portable device.

In contrast, if individual Layers 1 to 3 are assigned to not overlap with each other in the background screen window as shown in FIGS. 6, 7, each cursor operational area is designated as independently covering only corresponding objects 7a to 7m. For instance, a user of the portable device 11 can operate the object 7a to 7e, a user of the portable device 12 can operate the object 7l to 7m, and a user of the portable device 13 can operate the object 7f to 7k. In this case, cursors or cursor operations may not compete with each other.

Designation of cursor operational area may be performed according to an instruction via each of the portable devices 11 to 13. Instead, it may be performed according to the specification transmitted from each portable device 11 to 13. Further, it may be performed according to user's operation for changing a cursor operational area.

Operations in the above configuration will be explained with reference to FIGS. 8 to 11. The following takes place under a condition that the portable device 11 establishes a communication line with (i.e., logins to) the navigation system 1.

At first, a user of the portable device 11 operates a request for login to the navigation system 1. The portable device 11 transmits a login request signal including a portable device ID and user ID to the system 1. Upon receiving the login request signal, the control unit 2 of the system 1 authenticates the portable device 11 by extracting the portable device ID and user ID from the login request signal while transmitting a login response signal including a system ID to the portable device 11 via the short range wireless communicator 3.

In contrast, the portable device 11 receives the login response signal from the system 1 authenticates the system 1 by extracting the system ID from the login response signal. When the authentication result is correct, an authentication correct signal is sent to the system 1. Further, when authentication result for the portable device 11 is correct and the authentication correct signal is received from the portable device 11, the control unit 2 determines that bi-directional authentication results are correct and transmits a login permit signal to the portable device 11.

Next, suppose that the user of the portable device 11 performs a cursor operation to request drawing. The portable device 11 transmits a drawing request signal according to the cursor operation to request drawing performed by the user. Upon receiving the drawing request signal, the control unit 2 determines whether a sectional memory space assigned to the portable device 11 in the memory space of the drawing memory device 6 is currently equal to or larger than a predetermined data volume. Thus, the control unit 2 may function as a determination means or unit to determine whether or not the memory space is equal to or greater than a predetermined data volume. The predetermined data volume is set as being capable of sufficiently developing the drawing data.

When the sectional memory space is equal to or larger than the predetermined data volume, the control unit 2 reads out necessary drawing data from the resource database 10 to thereby develop the read drawing data in the sectional memory space for the portable device 11. Thus, a screen window is displayed in the primary display unit 7 based on the developed drawing data.

Figure 9:
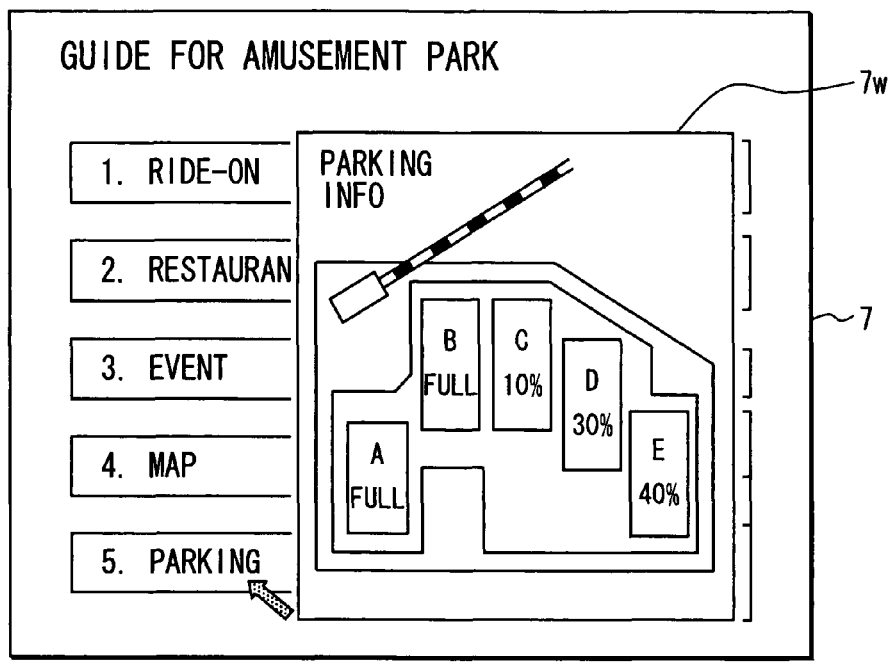
FIG. 9 is an example of a screen window in the navigation system.

For instance, with reference to FIG. 9, a user operates (i.e., clicks) a button "PARKING" via the portable device 11. When the sectional memory space for the portable device 11 exceeds the predetermined data volume, the control unit 2 develops the drawing data corresponding to "PARKING" in the sectional memory space for the portable device 11 to thereby cause the primary display unit 7 to display a screen window 7w based on the drawing data. Thus the user of the portable device 11 can check for information on available parking spaces in the primary display unit 7.

Figure 10:
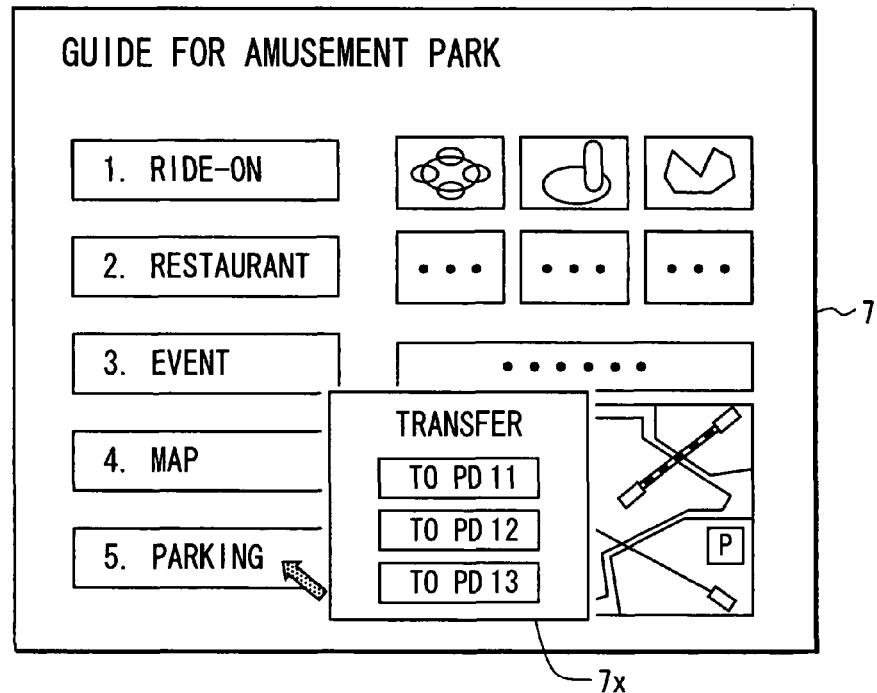
FIG. 10 is an example of a screen window in the navigation system.

In contrast, when the sectional memory space is less than the predetermined data volume (i.e., the sectional memory space for the portable device 11 is lacking), the control unit 2 causes the primary display unit 7 to display a transfer selection screen window 7x as shown in FIG. 10. In this case, the control unit 2 refers to the portable device data stored in the resource database 10 to thereby determine portable devices, which have sufficient vacancies in the drawing memory devices and to which the drawing data can be transferred. The list of the determined portable devices are displayed as a transfer selection screen window 7x in the primary display unit 7. According to the user's selection in the transfer selection screen window 7x, the control unit 2 reads out necessary drawing data from the resource database 10 and transfers or forwards the read drawing data to the portable device selected as a forwarded portable device without developing it in the sectional memory space for the portable device 11 in the drawing memory device 6. Thus the forwarded drawing data is developed in the memory space in the drawing memory device of the forwarded portable device.

Figure 11:
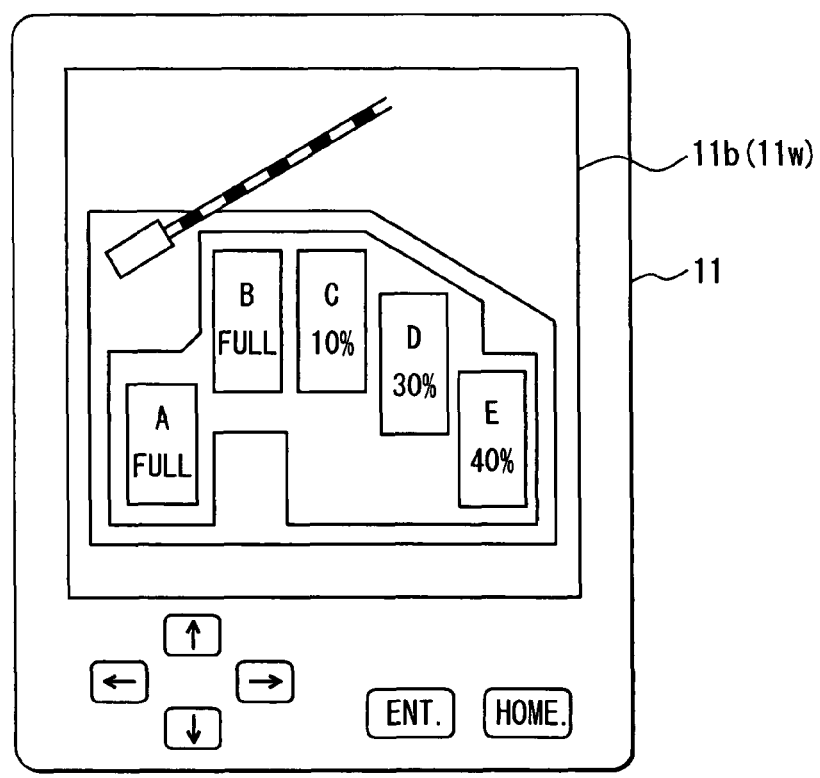
FIG. 11 is an example of a screen window in the portable device.

For instance, with reference to FIG. 10, a user operates (i.e., clicks) a button "PARKING" via the portable device 11. When the sectional memory space for the portable device 11 in the drawing memory device 6 is less than the predetermined data volume, the control unit 2 causes the primary display unit 7 to display the transfer selection screen window 7x for selecting one of the portable devices 11 to 13. According to a portable device (e.g., portable device 11) selected by the user, the control unit 2 transfers the drawing data corresponding to "PARKING" to the portable device 11 to thereby develop it in the memory space in the drawing memory device 11a of the forwarded portable device 11. Thus, as shown in FIG. 11, a screen window 11w is displayed based on the drawing data in the display unit 11b of the portable device 11. Thus the user of the portable device 11 can check for information on available parking spaces in the display unit 11b (functioning as a secondary display unit different from the primary display unit 7) of the own portable device 11.

(Modifications)

In the above embodiment, information on available parking spaces is used for the explanation; however, another information can be naturally displayed according to the process achieved in the embodiment. For instance, the embodiment can be applied to a case when a map is enlarged or when a retrieval result is displayed.

In the above embodiment, a forwarded device or display unit to which the drawing data is transferred is the portable device 11 possessed by a user (i.e., own portable device); however, a forwarded device may be the portable device 12, 13 other than the own portable device 11.

Further, when a head-up display 8 or meter-panel display 9 as the secondary display unit has a drawing memory device, it can be a forwarded device or display unit to which the drawing data is transferred. When only one forwarded device is present, it is designed that a user only selects whether or not the drawing data are required to be transferred without need of displaying the list of forwarded devices.

When a cursor corresponding to each of the portable devices 11 to 13 is displayed in the primary display unit 7, the cursor may depart from the cursor operational area. In this case, not displaying the cursor in the primary display unit 7 may be effective in indicating that the cursor is outside of the cursor operational area.

The cursor may be displayed with a mark indicating whether the cursor can be operated or not.

When an operation to move a cursor back to a home position is performed in the portable device 11 to 13, the primary display unit 7 may display the corresponding cursor in the home position in the primary display unit 7.

The multiple display system may be adapted to another device other than the navigation system. The portable device and navigation system may communicate with each other via a wired communication line. The navigation system may establish communication lines with portable devices more than three at the same time.

As explained above, according to the embodiment, a cursor operation for requesting a drawing occurs in a portable device 11. An in-vehicle navigation system 1 thereby makes a determination as to whether or not a segmental memory space assigned to the portable device 11 in a memory space of a drawing memory device 6 has at least a predetermined data volume. When the determination is affirmed, necessary drawing data are read out from a resource database 10 and forwarded to a drawing memory device 11a of the portable device 11 to be developed therein. A screen window is then displayed in a display unit 11b of the portable device 11 based on the developed drawing data.

Thus, an in-vehicle multiple cursor system properly provides information necessary for a user in case that the number of wirelessly connected portable devices increases to thereby cause lack of a memory space for drawing.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As a first aspect, a multiple cursor system in a vehicle is provided as follows. A communicator is included for establishing a communication line with a portable device capable of operating a cursor. A drawing data storing unit is included for storing drawing data. A drawing memory device is included for developing drawing data. A control unit is included for displaying the cursor relative to the portable device in a display unit, and defining in the drawing memory device a memory space for the portable device. A determination unit is included for performing a determination as to whether or not the defined memory space is equal to or greater than a predetermined data volume when the cursor is operated to request a drawing from the portable device via the communicator. The control unit reads drawing data necessary for the drawing from the drawing data storing unit to develop the read drawing data in the memory space in the drawing memory device, thereby displaying a screen window in the display unit when the determination is affirmed. The control unit reads drawing data necessary for the drawing from the drawing data storing unit, and transfers the read drawing data to an additional drawing memory device to develop the read drawing data in an additional memory space of the additional drawing memory device, thereby displaying a screen window in an additional display unit when the determination is negated.

Increase of the number of wirelessly connected portable devices may cause a lack of the memory space in the drawing memory device. Under the above configuration, the drawing data can be transferred to another drawing memory device and developed in the corresponding another memory space. Thus, a screen window based on the transferred drawing data can be displayed in another display device, e.g., a display unit of the portable device. Information necessary for the user can be properly provided in another display unit.

As an optional characteristic of the first aspect, a selection unit is further included for a user to select an additional display unit. The control unit transfers the read drawing data to an additional drawing memory device corresponding to the additional display unit selected via the selection unit to develop the read drawing data in an additional memory space of the additional drawing memory device, thereby displaying a screen window in the additional display unit when the determination is negated. Thus, a screen window based on the drawing data can be displayed in another display unit selected by the user, thereby allowing necessary information to be properly provided to the user.

As an optional characteristic of the first aspect, the communicator establishes communication lines with a plurality of portable devices capable of operating individual cursors, which are displayed in the display unit by the control unit. When the cursors in the display unit have individual cursor operational areas, which are at least partially overlapped with each other, the control unit defines priority degrees for the individual cursors and performs operations requested by the cursors based on the priority degrees. Thus, since priority degrees are previously assigned, competition of the multiple cursors in the display unit can be prevented.

As an optional characteristic of the first aspect, the communicator establishes communication lines with a plurality of portable devices capable of operating individual cursors, which are displayed in the display unit by the control unit. The cursors in the display unit have individual cursor operational areas, which are separated from each other without being overlapped with each other. Thus, competition of the multiple cursors in the display unit can be prevented.

As an optional characteristic of the first aspect, the cursor in the display unit has a cursor operational area, and the display control unit causes the display unit to indicate whether or not the cursor is within the cursor operational area. Thus, it can be easily understood whether an operation of the cursor is effective or not.

As an optional characteristic of the first aspect, when the cursor is operated from the portable device to move to a home position, the display control unit causes the display unit to display the cursor in the home position. This allows the user to securely discern the cursor or the position of the cursor in the display unit.

As an optional characteristic of the first aspect, the communicator establishes communication lines, which are functional in a compartment of the vehicle, with a plurality of portable devices capable of operating individual cursors. The display unit is a primary display unit disposed to the vehicle and is allowed by the control unit to simultaneously display the individual cursors corresponding to the plurality of portable devices. The additional display unit is a secondary display unit provided in one of the portable devices.

As an optional characteristic of the first aspect, the additional display unit is a secondary display unit provided in a windshield or a meter panel of the vehicle.

As an optional characteristic of the first aspect, the predetermined data volume is defined as being sufficient for drawing using corresponding drawing data.

As a second aspect, a method is provided for displaying in a display unit multiple cursors remotely operated by a plurality of portable devices. The method comprises: receiving a request for drawing via one cursor operated from one portable device; reading drawing data necessary for the drawing; performing a determination as to whether or not the drawing is allowed in the display unit by checking for a memory space assigned to the one portable device for display in the display unit; displaying, when the determination is affirmed, a screen window in the display unit based on the read drawing data; and displaying, when the determination is negated, a screen window in an additional display unit different from the display unit based on the read drawing data transferred to the additional display unit. The above method can produce an advantage similar to that of the multiple cursor system of the first aspect.

It will be obvious to those skilled in the art that various changes may be made in the above-described embodiments of the present invention. However, the scope of the present invention should be determined by the following claims.

What is claimed is:

1. A multiple cursor system in a vehicle, the system comprising:
    a communicator for establishing a communication line with a portable device capable of operating a cursor;
    a drawing data storing unit for storing drawing data;
    a drawing memory device for developing drawing data;
    a control unit for displaying the cursor relative to the portable device in a display unit, and defining in the drawing memory device a memory space for the portable device;
    a determination unit for performing a determination as to whether or not the defined memory space is equal to or greater than a predetermined data volume when the cursor is operated to request a drawing from the portable device via the communicator,
    the control unit being further configured, when the determination is made such that the defined memory space is not equal to or greater than the predetermined data volume, to cause the display unit to display a transfer selection screen window to enable a user to determine an additional display unit to display the drawing,
    wherein:
    (i) when the determination is made such that the defined memory space is equal to or greater than the predetermined data volume, the control unit reads drawing data necessary for the drawing from the drawing data storing unit to develop the read drawing data in the memory space in the drawing memory device, thereby displaying a screen window in the display unit when the determination is affirmed; and (ii) when the determination is made such that the defined memory space is not equal to or greater than the predetermined data volume, the control unit reads drawing data necessary for the drawing from the drawing data storing unit, and transfers the read drawing data to an additional drawing memory device to develop the read drawing data in an additional memory space of the additional drawing memory device instead of in the memory space of the drawing memory device, thereby displaying a screen window in the additional display unit in a case that the user determines the additional display unit via the transfer selection screen window.

2. The multiple cursor system of claim 1, wherein the transfer selection screen window displayed in the display unit when the determination is made such that the defined memory space is not equal to or greater than the predetermined data volume contains a selection unit for a user to select one of additional display units, wherein the control unit transfers the read drawing data to an additional drawing memory device corresponding to the additional display unit selected via the selection unit to develop the read drawing data in an additional memory space of the additional drawing memory device, thereby displaying a screen window in the additional display unit, when the determination is made such that the defined memory space is not equal to or greater than the predetermined data volume.

3. The multiple cursor system of claim 1, wherein:
the communicator establishes communication lines with a plurality of portable devices including the portable device recited in claim 1, the portable devices being capable of operating individual cursors, which are displayed in the display unit by the control unit; and
when the cursors in the display unit have individual cursor operational areas, which are at least partially overlapped with each other, the control unit defines priority degrees for the individual cursors and performs operations requested by the cursors based on the priority degrees.

4. The multiple cursor system of claim 1, wherein:
the communicator establishes communication lines with a plurality of portable devices including the portable device recited in claim 1, the portable devices being capable of operating individual cursors, which are displayed in the display unit by the control unit; and
the cursors in the display unit have individual cursor operational areas, which are separated from each other without being overlapped with each other.

5. The multiple cursor system of claim 1, wherein:
the cursor in the display unit has a cursor operational area; and
the display control unit causes the display unit to indicate whether or not the cursor is within the cursor operational area.

6. The multiple cursor system of claim 1, wherein when the cursor is operated from the portable device to move to a home position, the display control unit causes the display unit to display the cursor in the home position.

7. The multiple cursor system of claim 1, wherein the communicator establishes communication lines, which are functional in a compartment of the vehicle, with a plurality of portable devices including the portable device recited in claim 1, the portable devices being capable of operating individual cursors;
the display unit is a primary display unit disposed to the vehicle and is allowed by the control unit to simultaneously display the individual cursors corresponding to the plurality of portable devices; and
the additional display unit is a secondary display unit provided in one of the portable devices.

8. The multiple cursor system of claim 1, wherein the additional display unit is a secondary display unit provided in a windshield or a meter panel of the vehicle.

9. The multiple cursor system of claim 1, wherein the predetermined data volume is defined as being sufficient for drawing using corresponding drawing data.

* * * * *